United States Patent Office 3,509,150
Patented Apr. 28, 1970

---

3,509,150
**4 - AMINO - 7 - HALO - 6 - PTERIDINECARBOX-
YLIC ACID ESTERS AND A PROCESS FOR
THEIR PREPARATION**
Samuel F. Sisenwine, Conshohocken, Pa., assignor to
American Home Products Corporation, New York,
N.Y., a corporation of Delaware
No Drawing. Filed Feb. 1, 1968, Ser. No. 702,178
Int. Cl. C07d 57/28
U.S. Cl. 260—251.5           3 Claims

ABSTRACT OF THE DISCLOSURE

The invention concerns novel 4-amino-7-halo-6-pteridine-carboxylic acid esters and a method in which they may be used as starting materials in the preparation of 4,7-diamino-6-pteridine-carboxamides. The former products are useful as central nervous system depressants and as intermediates to prepare the latter compounds which are useful in comparative and experimental pharmacology as diuretics.

---

This invention relates to a new class of pteridine compounds which are intermediates in the preparation of 4,7-diamino-6-pteridine carboxamides. More particularly, it relates to 4-amino-7-halo-6-pteridine carboxylic acid esters and a method for their preparation. The compounds of this invention may be represented by the formula

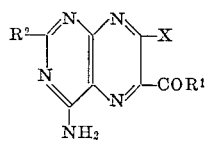

(I)

Where
X is chlorine or bromine;
$R^1$ is lower alkoxy; and
$R^2$ is hydrogen, 2-thienyl, 3-thienyl, lower alkyl, phenyl or phenyl substituted with halogen, nitro, amino, hydroxy, lower alkoxy, lower alkyl or halo(lower)alkyl.

The terms "lower alkyl," "lower alkoxy," and the like, as used herein refer to straight chain and branched groups having 1 to 6 carbon atoms therein.

The compounds of this invention may be prepared and utilized according to the following synthetic procedure.

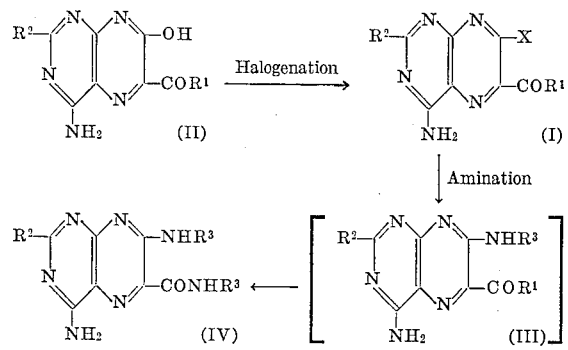

Where
$R^1$, $R^2$ and X are as defined above; and
$R^3$ is hydrogen; lower alkyl; lower alkoxy(lower)alkyl, for example methoxyalkyl; dialkylaminoalkyl, for example diethylaminoethyl; morpholino(lower)alkyl, for example morpholinoethyl; piperidino(lower)alkyl, for example, piperidinoethyl; and lower alkylthio(lower)alkyl, for example ethylthioethyl.

The reaction may be carried out by contacting an alkyl-4-amino-7-hydroxy - 6 - pteridinecarboxylate (II) with a halogenation agent, e.g. phosphorus oxychloride, thionyl chloride, phosphorus tribromide, or the like, at a temperature range from about 75° C. to about 105° C., preferably at the reflux temperature, for a period of about one to about twenty-four hours, preferably two hours. Thereafter, the reaction mixture is cooled, poured into ice, stirred until all the unreacted phosphorus oxychloride, thionyl chloride, phosphorus tribromide, or the like is hydrolyzed, then neutralized, for instance with sodium bicarbonate. The product of this reaction is a 4-amino-7-halo-6-pteridine carboxylic acid ester (I) which is then recovered by filtration and recrystallized, for instance, from a lower alkanol.

To form a 4,7-diamino-6-pteridine carboxamide (IV) which is the end product of the reaction, a 4-amino-7-halo-6-pteridine carboxylic acid ester (I) may be mixed with an excess of an amine, such as an alkoxyalkylamine, for instance, 2-methoxyethylamine, in an organic solvent in which the reactants are substantially soluble, such as lower alkanol, for example, ethanol, isopropanol, or ethoxyethanol. The amine has the formula $R_4NHR_3$, where $R_3$ is defined as above, and $R_4$ is lower alkyl. The reaction mixture is heated at temperatures from about 50° C. to about 110° C., preferably at the reflux temperature, for about one to about twelve hours, preferably about two hours. The reaction is believed to pass through an intermediate (III) as depicted in the above reaction sequence which is not separated or recovered. The 4,7-diamino-6-pteridinecarboxamide (IV) may be recovered by well-known techniques such as filtration and recrystallization from a lower alkanol, such as methanol.

The alkyl-4-amino-7-hydroxy-6-pteridine - carboxylate (II) starting materials may be prepared as described in Osdene et al., J. Medicinal Chemistry, 9,697 (1966).

As described in U.S. Patent, 3,254,085, issued May 31, 1966, the 4,7-diamino-6-pteridinecarboxamides (IV) have been found to possess interesting pharmaceutical properties which render them useful as synthetic medicinals, for instance as diuretics. The 4-amino - 7-halo-6-idinecarboxylic acid esters (I) have utility as intermediates in the preparation of 4,7-diamino-6-pteridine-carboxamides (IV). The 4-amino-7-halo-6-pteridinecarboxylic acid esters (I) also have utility as central nervous system depressants and as mydriatic agents.

In the pharmacological evaluation of the central nervous system activity and autonomic activity of the 4-amino-7-halo-6-pteridinecarboxylic acid esters (I) of this invention, the in vivo effects are tested as follows. The compound to be tested is administered intraperitoneally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tacticle stimulation, twitching), general depression (i.e., decreased spontaneous motor activity, decreased respiration) and autonomic activity (i.e., miosis, mydriasis, diarrhea) are noted. The 4-amino - 7-halo - 6-pteridinecarboxylic acid esters (I) in the above procedure induce central nervous system depressant effects and mydriasis in mice in all the stated dose ranges.

In order more clearly to disclose the nature of the present invention, specific examples of the practice of the invention are hereinafter given.

EXAMPLE I

This example illustrates the preparation of a 4-amino-7-halo - 6-pteridinecarboxylic acid ester (I), the latter being 4-amino-7-chloro-2-phenyl-6-pteridinecarboxylic acid, ethyl ester.

Ten grams of ethyl-4-amino-7-hydroxy-2-phenyl-6-pteridinecarboxylate in fifty milliliters of phosphorus oxychloride ($POCl_3$) are refluxed for two hours. The reaction mixture is then poured into 500 grams of ice, stirred until all the unreacted $POCl_3$ is hydrolyzed, and the neutralized with sodium bicarbonate ($NaHCO_3$). A yellow precipitate is collected by filtration and recrystallized from methanol. The product is 4-amino-7-chloro-2-phenyl-6-pteridinecarboxylic acid ethyl ester having a melting point of 238° C.

Based on the formula $C_{15}H_{12}N_5O_2Cl$ it is calculated that the elemental analysis by weight would be 54.61 percent carbon, 3.67 percent hydrogen, 21.25 percent nitrogen and 10.75 percent chlorine. The product is analyzed, and the content is found to be 54.61 percent carbon, 3.67 percent hydrogen, 21.13 percent nitrogen and 10.90 percent chlorine. This may be expressed:

Calc'd for $C_{15}H_{12}N_5O_2Cl$ (percent): C, 54.61; H, 3.67; N, 21.25; Cl, 10.75. Found (percent): C, 54.61; H, 3.67; N, 21.13; Cl, 10.90.

Following the foregoing procedure but substituting the following starting materials, the following products are afforded, respectively:

| | Starting materials | Product |
|---|---|---|
| A | Methyl-4-amino-7-hydroxy-2-(m-ethylphenyl)-6-pteridinecarboxylate and phosphorus oxychloride. | 4-amino-7-chloro-2-(m-ethylphenyl)-6-pteridinecarboxylic acid, methyl ester. |
| B | Hexyl-4-amino-7-hydroxy-6-pteridinecarboxylate and thionyl chloride. | 4-amino-7-chloro-6-pteridinecarboxylic acid, hexyl ester. |
| C | Ethyl-4-amino-7-hydroxy-2-(2-thienyl)-6-pteridine carboxylate and thionyl chloride. | 4-amino-7-chloro-2-(2-thienyl)-6-pteridinecarboxylic acid, ethyl ester. |
| D | Ethyl-4-amino-7-hydroxy-2-(3-thienyl)-6-pteridine carboxylate and thionyl chloride. | 4-amino-7-chloro-2-(3-thienyl)-6-pteridinecarboxylic acid, ethyl ester. |
| E | Ethyl-4-amino-7-hydroxy-2-methyl-6-pteridine carboxylate and thionyl chloride. | 4-amino-7-chloro-2-methyl-6-pteridinecarboxylic acid, ethyl ester. |
| F | Ethyl-4-amino-7-hydroxy-2-ethyl-6-pteridinecarboxylate and thionyl chloride. | 4-amino-7-chloro-2-ethyl-6-pteridinecarboxylic acid, ethyl ester. |
| G | Ethyl-4-amino-2-butyl-7-hydroxy-6-pteridine carboxylate and thionyl chloride. | 4-amino-2-butyl-7-chloro-6-pteridinecarboxylic acid, ethyl ester. |
| H | Propyl-4-amino-7-hydroxy-2-tolyl-6-pteridinecarboxylate and phosphorus oxychloride. | 4-amino-7-chloro-2-tolyl-6-pteridinecarboxylic acid, propyl ester. |
| I | Ethyl-4-amino-7-hydroxy-2-(m-methoxyphenyl)-6-pteridine carboxylate and phosphorus tribromide. | 4-amino-7-bromo-2-(p-methoxyphenyl)-6-pteridinecarboxylic acid, ethyl ester. |
| J | Ethyl-4-amino-7-hydroxy-2-(p-ethoxyphenyl)-6-pteridinecarboxylate and thionyl chloride. | 4-amino-7-chloro-2-(p-ethoxyphenyl)-6-pteridinecarboxylic acid, ethyl ester. |
| K | Ethyl-4-amino-7-hydroxy-2-(p-nitrophenyl)-6-pteridinecarboxylate and phosphorus tribromide. | 4-amino-7-bromo-2-(p-nitrophenyl)-6-pteridinecarboxylic acid, ethyl ester. |
| L | Ethyl-4-amino-2-(o-chlorophenyl)-7-hydroxy-6-pteridinecarboxylate and phosphorus tribromide. | 4-amino-7-bromo-2-(o-chlorophenyl)-6-pteridinecarboxylic acid, ethyl ester. |
| M | Butyl-4-amino-7-hydroxy-2-(p-fluorophenyl)-6-pteridine carboxylate and thionyl chloride. | 4-amino-7-chloro-2-(p-fluorophenyl)-6-pteridine carboxylic acid, butyl ester. |
| N | Ethyl-4-amino-2-(p-bromophenyl)-7-hydroxy-6-pteridinecarboxylate and thionyl chloride. | 4-amino-2-(p-bromophenyl)-7-chloro-6-pteridinecarboxylic acid, ethyl ester. |
| O | Ethyl-4-amino-7-hydroxy-2-(p-iodophenyl)-6-pteridinecarboxylate and thionyl chloride. | 4-amino-7-chloro-2-(p-iodophenyl)-6-pteridinecarboxylic acid, ethyl ester. |
| P | Ethyl-4-amino-2-(m-trifluoromethylphenyl)-7-hydroxy-6-pteridinecarboxylate and phosphorus oxychloride. | 4-amino-7-chloro-2-(m-trifluoromethylphenyl)-6-pteridinecarboxylic acid, ethyl ester. |
| Q | Ethyl-4-amino-2-(m-aminophenyl)-7-hydroxy-6-pteridinecarboxylate and phosphorus oxychloride. | 4-amino-7-chloro-2-(p-aminophenyl)-6-pteridinecarboxylic acid, ethyl ester. |
| R | Ethyl-4-amino-2-[m-(2-chloroethyl)phenyl]-7-hydroxy-6-pteridinecarboxylate and thionyl chloride. | 4-amino-7-chloro-2-[p-(2-chloroethyl)phenyl]-6-pteridinecarboxylic acid, ethyl ester. |
| S | Ethyl-4-amino-7-hydroxy-2-(m-hydroxyphenyl)-6-pteridinecarboxylate and phosphorus oxychloride. | 4-amino-7-chloro-2-(m-hydroxyphenyl)-6-pteridinecarboxylic acid, ethyl ester. |

EXAMPLE II

In 50 milliliters of methanol are dissolved 3.3 grams of 4-amino-7-chloro-2-phenyl-6-pteridinecarboxylic acid ethyl ester and 2.0 grams of 2-methoxyethylamine, and the solution refluxed for two hours. The crystalline solid product is suction filtered and recrystallized from methanol. The product is 4-amino-7-(2-methoxyethylamino)-N-(2-methoxyethyl)-2-phenyl-6-pteridinecarboxamide having a melting point of 234°. C.

Calculated for $C_{19}H_{23}N_7O_3$ (percent): C, 57.42; H, 5.83; N, 24.67. Found (percent): C, 56.94; H, 5.65; N, 24.38.

What is claimed is:
1. The compounds having the formula:

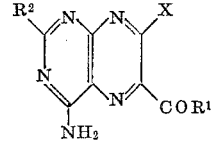

where X is selected from the group consisting of chlorine and bromine;
$R^1$ is lower alkoxy; and
$R^2$ is selected from the group consisting of hydrogen, lower alkyl, 2-thienyl, 3-thienyl, and phenyl.

2. A compound as described in claim 1 which is: 4-amino-7-chloro-2-phenyl-6-pteridinecarboxylic acid, ethyl ester.

3. A compound as described in claim 1 which is: 4-amino-7-bromo-2-phenyl-6-pteridinecarboxylic acid, ethyl ester.

References Cited

UNITED STATES PATENTS

| | | | |
|---|---|---|---|
| 3,122,543 | 2/1964 | Osdene | 260—251.5 |
| 3,219,665 | 11/1965 | Weinstock | 260—251.5 |
| 3,254,085 | 5/1966 | Osdene | 260—251.5 |

NICHOLAS S. RIZZO, Primary Examiner
R. V. RUSH, Assistant Examiner

U.S. Cl. X.R.
260—999